Patented May 11, 1937

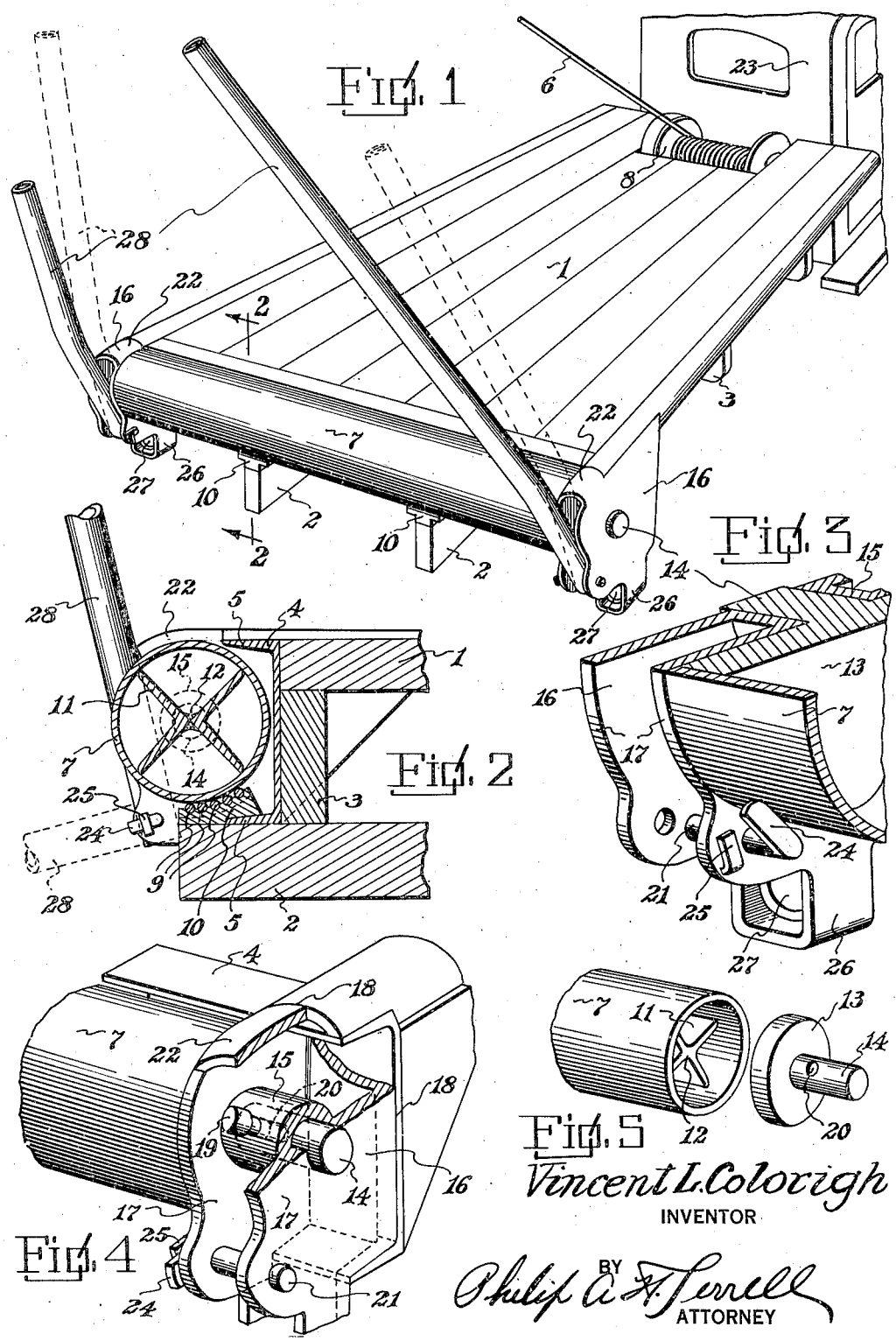

2,079,790

UNITED STATES PATENT OFFICE 2,079,790

TRUCK BODY ATTACHMENT

Vincent L. Colorigh, Tulsa, Okla.

Application September 23, 1936, Serial No. 102,234

5 Claims. (Cl. 214—84)

The invention relates to truck bodies and particularly to attachments for truck bodies involving a rotatable cable guide roller extending across the rear end of the truck body and having a rolling engagement with the drag cable for dragging heavy articles to the truck to be loaded thereon. The device is particularly adapted for use in connection with trucks used in oil fields where heavy items of machinery necessarily have to be dragged to position on account of unevenness of the ground or other field conditions.

A further object is to provide bearing members supporting the roller in spaced relation to its ends, thereby preventing sagging of the roller incident to the strain.

A further object is to provide latching means for preventing rotation of the roller when not in use, thereby preventing danger of workmen becoming injured incident to stepping on the roller while working on the truck body.

A further object is to provide brace means within the roller for preventing collapse of the walls thereof incident to strain thereon.

A further object is to provide U-shaped brackets at the ends of the roller for supporting the pintles of the roller, said brackets having spaced flanges between which the legs of a breast derrick are pivotally mounted.

A further object is to utilize the U-shaped brackets for housing means for tail lights for the vehicle.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the rear end of truck body, showing the device applied thereto.

Figure 2 is a vertical transverse sectional view taken on line 2—2 of Figure 1.

Figure 3 is a detail perspective view of one of the supporting brackets for the roller.

Figure 4 is a detail perspective view of one end of the truck body corner, parts being broken away to better show the structure.

Figure 5 is a detail collective view of one end of the roller and its pintle carrying plate, showing the spider within the roller for bracing the same and the pintle plate in position to be assembled in the roller end and secured therein.

Referring to the drawing, the numeral 1 designates a truck body, which truck body is provided with longitudinally extending beams 2 which are in turn connected to the truck body by transverse beams 3. The beams 2 extend beyond the rear end of the truck body 1 as clearly shown in Figure 2 and are connected together by a transverse channel beam 4, which has its flanges 5 rearwardly disposed. Beam 4 braces the rear end of the truck body where it receives the greatest strain during a loading, and particularly during a dragging operation where heavy articles are dragged with the rear end of the truck body for loading purposes. It has been found that during a dragging operation, when the cable 6 is passed over the rear end of the truck body or over a round surface, for instance a stationary pipe, the wire strands of the cable become worn, particularly after the cable wears into the pipe or truck body end, consequently the cable rapidly deteriorates and breaks. To obviate this difficulty the rear end of the truck body is provided with a transversely disposed rotatable roller 7, over which the cable 6 moves with a rolling engagement, hence there is not a cutting or sawing operation of the cable, as it is wound around the winch drum 8.

The device is particularly adapted for use in oil fields where heavy pieces of machinery and apparatus necessarily have to be dragged from remote positions to the truck. Under these conditions there is a terrific strain downwardly on the roller 7, and to prevent sagging of the roller incident to this strain, the roller is supported by a plurality of arcuately arranged roller bearings 9 carried by the beam ends 2.

It will be noted that the strain of the cable on the roller 7 will be taken up by the roller bearings 9, mounted in the bearing blocks 10, consequently roller 7 will not sag. To prevent collapsing of the wall of the roller 7, the same is braced by a spider 11, extending longitudinally therethrough, and which spider is preferably formed from angle bars, welded together at 12. After the spider has been placed within the roller 7, the pintle plates 13 are placed in the roller ends and are secured therein preferably by a welding. The pintle plates 13 are provided with pintles 14, which extend through bearing sleeves 15 carried by the end brackets 16, at the rear corners of the truck body. The bearing sleeves 15 connect spaced plates 17, forming the brackets, and which brackets are secured to the corners of the truck body, and to the channel bar 4, in any suitable manner, for instance by welding at 18. It will be seen that the roller bearings 9 will positively support the roller 7 against sagging, consequently the pintles 14 will not bind in their bearing sleeves 15.

It has been found that it is desirable at times to prevent rotation of the roller 7, particularly when the roller is not in use and workmen are moving around on the truck body. When the foot of a person engages the roller, it would be extremely dangerous as it would rotate and throw the person from the truck body. To obviate this difficulty, one of the bosses 15 is provided with a removable pin 19, which extends through the boss and into an aperture 20 in the pintle 14, therefore it will be seen that the roller can be positively held against rotation.

By providing the spaced plates 17, forming the brackets 16, space is provided between which the legs 28 of a conventional form of breast derrick may be pivoted on pins 21, and below the upper closed ends 22 of the brackets 16. By so positioning the legs 28, it will be seen that the upper arcuate ends 22 of the brackets will prevent the derrick from falling forwardly in relation to the truck body and injuring workmen thereon, or the driver in the cab 23. This is extremely desirable as many accidents are caused this way and many States have laws requiring structures which will prevent the breast derrick from pivoting forwardly on the vehicle. The pins 21 are of the non-threaded type so that they can be rapidly placed in position or removed. Their inner ends are provided with angularly disposed arms 24, which, when the pins are rotated, are received behind the members 25 carried by the inner sides of the brackets for preventing accidental displacement of the pins. The lower ends of the brackets 16 terminate in downwardly extending U-shaped portions 26, in which the tail lights 27 of the vehicle are received and are protected from damage. It will be noted that the lights are not only protected, but positioned at the extreme width points of the body, thereby complying with the regulations in this respect.

From the above it will be seen that a cable guide means is provided for heavy duty trucks, and which guide involves a roller which will not sag incident to strain, and one which will have a rolling contact with the cable at all times, thereby preventing breaking of cable strands and consequent weakening of the cable.

The invention having been set forth what is claimed as new and useful is:

1. The combination with the rear end of a truck body, of a rotatable cable guide roller carried thereby, said roller having its upper side in the plane of the truck body surface and means cooperating with the roller for preventing rotation of the roller in either direction when not in use.

2. The combination with the rear end of a truck body, of a cable guide roller carried thereby and extending entirely across said end, said roller having pintles, corner brackets carried by the truck body end and in which the pintles of the roller are rotatably mounted, said corner brackets comprising spaced plates, sleeves connecting said plates and means carried by one of said sleeves and cooperating with one of the pintles for preventing rotation of the roller when not in use.

3. A device as set forth in claim 2 including brace means within the roller for preventing collapse thereof.

4. A device as set forth in claim 2 including a breast derrick having legs pivotally mounted between the plates of the brackets.

5. A device as set forth in claim 2 including a breast derrick having legs pivotally mounted between the plates of the brackets below the roller center and means carried by the brackets in the path of the breast derrick legs for limiting the pivotal movement thereof towards the body.

VINCENT L. COLORIGH.